United States Patent
Schlitzkus et al.

(10) Patent No.: US 8,123,308 B2
(45) Date of Patent: Feb. 28, 2012

(54) DEVICE FOR VIBRATION-DAMPING SUSPENSION OF A UNIT

(75) Inventors: Michael Schlitzkus, Dietmannsried (DE); Andreas Weh, Sulzberg (DE); Matthias Mayr, Rettenberg (DE)

(73) Assignee: Robert Bosch GmbH, Stuttgart (DE)

( * ) Notice: Subject to any disclaimer, the term of this patent is extended or adjusted under 35 U.S.C. 154(b) by 861 days.

(21) Appl. No.: 12/088,288

(22) PCT Filed: Sep. 18, 2006

(86) PCT No.: PCT/EP2006/066434
§ 371 (c)(1),
(2), (4) Date: Mar. 27, 2008

(87) PCT Pub. No.: WO2007/036446
PCT Pub. Date: Apr. 5, 2007

(65) Prior Publication Data
US 2008/0217824 A1     Sep. 11, 2008

(30) Foreign Application Priority Data

Sep. 29, 2005    (DE) .......................... 10 2005 046 631

(51) Int. Cl.
*B60T 8/36* (2006.01)
(52) U.S. Cl. ................ 303/119.2; 267/140.11; 267/293; 303/116.4; 303/119.3; 248/610
(58) Field of Classification Search ............... 303/119.2, 303/119.3, 116.4, DIG. 10; 267/141.1, 141.2, 267/140.11, 293; 248/636, 638, 610, 611, 248/560; 417/363; 403/221, 228, 243, 351, 403/352, 365–369, 390, 290
See application file for complete search history.

(56) References Cited

U.S. PATENT DOCUMENTS 5,464,187 A * 11/1995 Linkner, Jr. ................... 248/635
(Continued)

FOREIGN PATENT DOCUMENTS

DE         197 24 177 A1     12/1998
(Continued)

*Primary Examiner* — Robert Siconolfi
*Assistant Examiner* — Mariano Sy
(74) *Attorney, Agent, or Firm* — Ronald E. Greigg

(57) ABSTRACT

The invention relates to a device for suspending a unit, especially a hydraulic unit of an electronically traction-controlled brake system of a motor vehicle. The unit is suspended in a receptacle provided on the vehicle such that vibrations are damped. Hydraulic units of vehicle brake systems are usually equipped with an electric motor for driving pumps located in the hydraulic unit. The brake pressure in the wheel brakes can be modulated via the pumps. The pump drive can cause mechanical and hydraulic vibrations in the unit which can result in unwanted operational noise in case the vibrations are transmitted to the vehicle body without being damped. The improved device is manually preloaded due to limited space for using tools. A clamping mechanism is guided in an axially movable manner on an armature which is fixed to the hydraulic unit and which can be moved from a basic position into a clamping position. The clamping mechanism is interlocked with the armature in both positions.

20 Claims, 3 Drawing Sheets

U.S. PATENT DOCUMENTS

| | | | | |
|---|---|---|---|---|
| 5,622,483 A * | 4/1997 | Nokubo | ........................ | 417/363 |
| 5,658,056 A * | 8/1997 | Rischen et al. | ............. | 303/119.2 |
| 5,685,150 A * | 11/1997 | Hinz et al. | .................... | 60/547.1 |
| 5,697,678 A * | 12/1997 | Huber | ......................... | 303/116.4 |
| 6,098,949 A * | 8/2000 | Robinson | ..................... | 248/635 |
| 6,296,236 B1 | 10/2001 | Ott | | |
| 6,746,089 B2 * | 6/2004 | Nakazawa | ................. | 303/116.4 |
| 7,004,552 B2 * | 2/2006 | Takumori et al. | .......... | 303/116.4 |
| 7,407,234 B1 * | 8/2008 | McCormick | ............... | 303/119.3 |
| 7,510,163 B2 * | 3/2009 | Schlitzkus et al. | ............ | 248/635 |
| 2003/0155809 A1 | 8/2003 | Schlitzkus et al. | | |
| 2007/0057422 A1 * | 3/2007 | Weh et al. | ...................... | 267/141 |
| 2008/0240852 A1 * | 10/2008 | Weh et al. | ...................... | 403/388 |

FOREIGN PATENT DOCUMENTS

| | | |
|---|---|---|
| DE | 100 36 575 A1 | 2/2002 |
| WO | WO 02/10610 A1 | 2/2002 |
| WO | WO 2004/031012 A1 | 4/2004 |

* cited by examiner

DEVICE FOR VIBRATION-DAMPING SUSPENSION OF A UNIT

CROSS-REFERENCE TO RELATED APPLICATION

This application is a 35 USC 371 application of PCT/EP 2006/066434 filed on Sep. 18, 2006.

BACKGROUND OF THE INVENTION

1. Field of the Invention

The invention is based on a device for vibration-damping suspension of a unit in a receptacle intended for it.

2. Description of the Prior Art

A device for vibration-damping suspension of a unit is already known, for instance from German Patent Disclosure DE 100 36 575 A1. This known device has a boltlike armature, secured to the unit, that protrudes in some portions past the outer dimensions of the unit. On this protruding portion of the armature, there is an elastomer part, with a middle portion of reduced outside diameter and with two end portions of greater outside diameter disposed on either side of the middle portion. The elastomer part rests with one of its end faces on the outer wail of the unit and cooperates, on the end diametrically opposed from that, with a rim of a bracing sleeve. A screw nut which is screwed onto a threaded portion on the outer end of the armature acts on the bracing sleeve. By tightening the screw nut, the elastomer part is axially prestressed, which brings about upsetting of the elastomer part in the axial direction in space and widening in the radial direction in space. Because of the deformation of the elastomer part, the middle portion presses on its circumference against the pairs of claws of the receptacle that embrace this middle portion. At the same time, the two end portions, with their faces toward the middle portion, are pressed laterally against the claws. The unit is thus supported indirectly in the receptacle via the elastomer part. Typically, for supporting the unit, a plurality of devices that are oriented in various directions in space is employed.

The goal of this kind of elastic suspension of a unit is to damp vibration transmission from the unit to the body of a motor vehicle. This vibration is engendered by an electric motor that is provided for actuating the pumps on the unit. The brake pressure at the wheel brakes can be modulated by the pumping mode. Without suitable damping of the attendant mechanical and hydraulic vibration, this vibration can be transmitted to the vehicle body and perceived as irritating by the occupants of the vehicle.

Tightening the aforementioned screw nuts of the devices disadvantageously requires a screwdriving tool. In the vehicle, however, there is as a rule only little free space available for using this screwdriving tool. Moreover, using the screwdriving tool makes the process of assembling the unit more difficult and time-consuming for the vehicle manufacturer.

SUMMARY AND ADVANTAGES OF THE INVENTION

By comparison, a device according to the invention has the advantage that it can be switched from its basic position to its clamping position by manual actuation, or in other words without the use of a tool. This makes the assembly process easier and shorter. According to the invention, for this purpose the device has a clamping element that is axially displaceable on the armature and that can be locked in both of its end positions to the armature.

Furthermore, the device may have an integrated actuation-securing means. This prevents actuation of the clamping means by mistake and at the same time provides security for the unit during shipping, because it absorbs impacts and thus prevents mechanical damage to the unit. This actuation-securing means is manually releasable. The release is effected, by means of a rotary motion of the clamping element relative to the armature. An especially advantageous feature embodies the clamping means as a bush provided with axial slits. As a result, the clamping means has spring properties, as a result of which, in both of its end positions, it can be reliably locked to the armature. Easy deformability of the elastomer part during its installation on the bracket is assured as long as the clamping means is in its basic position. At the same time, in its clamping position, the clamping means provides reinforcement of the elastomer part and thus assures its anchoring to the bracket under conditions that pertain in vehicle operation. Various options can be alternatively employed for anchoring the device of the invention.

Further advantages or advantageous refinements of the invention will become apparent from the ensuing description.

DESCRIPTION OF THE PREFERRED EMBODIMENT

Figure 1:
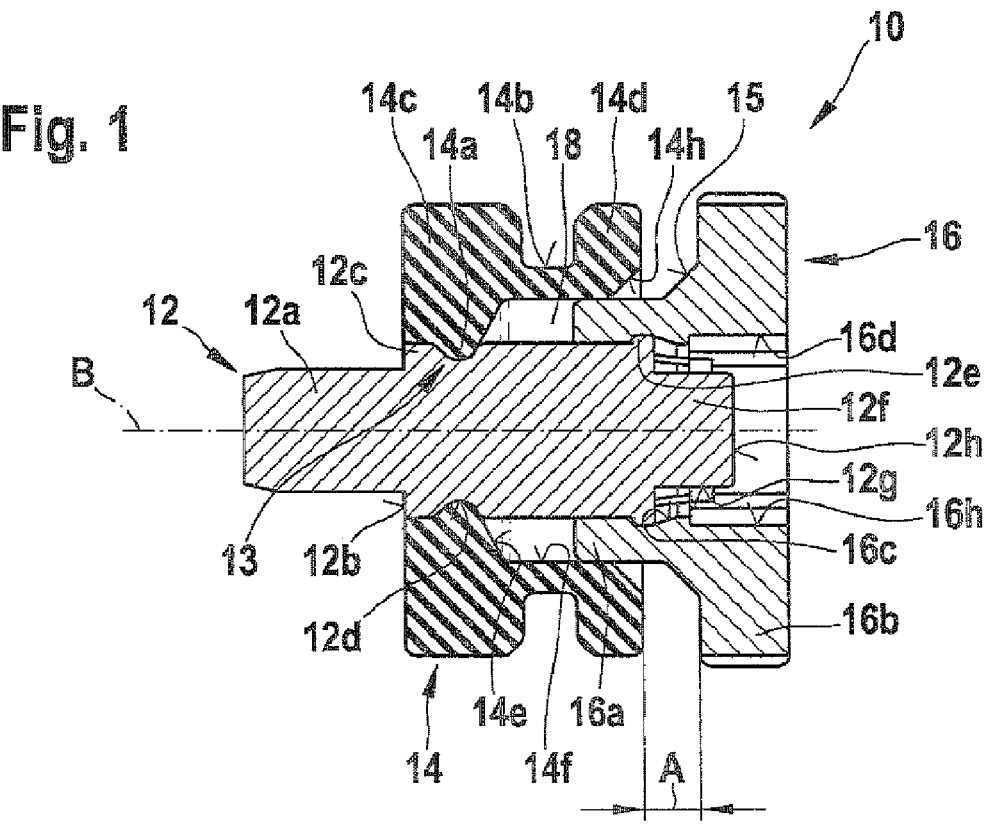
FIG. 1 shows the device of the invention as a preassembled structural unit in the basic position in longitudinal section.

The device 10 shown in FIG. 1 comprises an armature 12, an elastomer part 14 supported by the armature, and a clamping means 16 that in some portions plunges into the interior of this elastomer part 14. The clamping means 16 is guided axially displaceably on the armature 12 and can be switched from its basic position to a clamping position by manual actuation.

The armature 12 is a cylindrical metal part, preferably made from solid material, with a multiply-stepped external contour. The longitudinal axis of this armature 12 and hence of the entire device 10 is marked B in FIG. 1. A first armature portion 12a of reduced outside diameter serves to secure the armature in a receiving bore of a unit not shown in FIG. 1. This first portion 12a can be embodied for this purpose with a smooth or knurled surface on its circumference, if it is intended that the armature 12 be anchored in a receiving bore by press-fitting. Alternatively, this armature portion 12a could instead be provided with a male thread, if it should be intended that the connection of the armature 12 to the unit be made in the form of a screw connection. The first armature portion 12a merges at a rectangular shoulder 12b with a second armature portion 12c of greater outside diameter. At a short axial spacing from the shoulder 12b, this second armature portion 12c has a hollow-throatlike annular groove 12d, which is engaged by an extension 14a of complementary shape on the inner contour of the sleevelike elastomer part 14.

The annular groove 12d and the extension 14a thus form a positive engagement 13 between the elastomer part 14 and the armature 12. The second armature portion 12c ends in a protrusion 12e whose outside diameter is increased still further and which has an essentially rectangular cross section. This protrusion 12e is adjoined by a third armature portion 12f. This third armature portion 12f is embodied in the form of a rib, which extends transversely to the longitudinal axis B in a plane extending perpendicular to the plane of the drawing. The rib shape is due to the provision of two diametrically opposed flat faces 12g on the external contour of the armature 12. In the case of a device 10 screwed to a unit, these flat faces 12g may form wrench engagement faces for introducing a tightening torque on the armature 12.

On the armature 12, as already noted, an elastomer part 14 is retained by positive engagement 13. The elastomer part 14 is in sleeve form. It has a middle portion 14b that is recessed in its outside diameter and that is adjoined by both sides by end portions 14c and d of greater outside diameters. The first end portion 14c, toward the first armature portion 12a, is flush with the rectangular shoulder 12b of the armature 12 and has a greater axial length than the second end portion 14d. Both end portions 14c, d preferably have the same outside diameter. The inside contour of the elastomer part 14 is formed by the extension 14a, which engages the annular groove 12d in the armature 12 and is embodied in the region of the first end portion 14c of the elastomer part 14. At a conically embodied widened diameter 14e, this extension 14a merges with an inner wall of a blind-borelike chamber 18, which is enclosed between the elastomer part 14, the armature 12, and the clamping means 16. Its opening 14f closed by the clamping means 16 is provided with an outlet chamfer 14h extending all the way around. Viewed in the direction of the longitudinal axis B, the chamber 18 extends to beyond the middle portion 14b into the interior of the elastomer part 14, or in other words into the region below the first end portion 14c.

The clamping means 16 in FIG. 1 is in its basic position. It is likewise designed in sleevelike form and has a cylindrical collar 16a, which surrounds the armature 12 and guides the clamping means 16 axially displaceably on the armature 12. The collar 16a changes over, at the end of the clamping means 16 facing away from the elastomer part 14, to a radially encompassing rim 16b, forming an outer cone 15. The outside diameter of this rim is adapted to the outside diameter of the elastomer part 14 in such a way that the rim 16b substantially covers the end face of the elastomer part 14. The clamping means 16, in its interior along the longitudinal axis B, has two spaced-apart annular grooves 16c and 16d. These annular grooves 16c, d have rectangular front flanks. The back flank of the first annular groove 16c, which groove is oriented toward the elastomer part 14, extends in beveled fashion toward the armature 12. In the basic position shown, this first annular groove 16c is engaged by the protrusion 12e of the armature 12. As a result, the clamping means 16 is locked in captive fashion to the armature 12.

In FIG. 1, the collar 16a of the clamping means 16 extends into the elastomer part 14 only as far as the beginning of the middle portion 14b. The chamber 18 extending below the middle portion allows a deformation of the elastomer part 14 in this region with relatively slight force. As a result, the device 10 described can be introduced into a receptacle (FIG. 3, 32a, b, c) that surrounds the middle portion 14b.

In the basic position shown, the clamping means 16 protrudes past the armature portion 12f that is provided with the two flattened faces 12g. Between the rim 16b and the elastomer part 14, there is an axial spacing A. In the region of its rim 16b, the clamping means 16 has an internal contour 16h that is especially shaped. This contour is adapted in its shape and dimensions to the riblike external contour, resulting because of the flattened faces 12g, of the armature portion 12f. For switching the clamping means 16 from the basic position shown to the clamping position, the clamping means 16 must first be oriented relative to the armature 12 by a rotary motion that can likewise be performed manually. In the oriented position, the armature portion 12f can plunge into the internal contour 16h of the clamping means 16. In the non-oriented state, this is not possible, since the clamping means 16, with its wall surrounding the internal contour 16h, abuts against an end face 12h of the armature 12. The clamping means 16 is thus blocked against axial displacement on the bolt 12. In other words, the internal contour 16h of the clamping means 16 cooperates with the flattened faces 12g of the armature 12, acting as a manually releasable actuation-securing means 17 (FIG. 2) which is integrated with the device 10 and prevents unintended actuation of the clamping means 16. In addition, the actuation-securing means 17 acts as protection in shipping for a unit equipped with such a device, by protecting this unit against damage from impacts.

Figure 2:
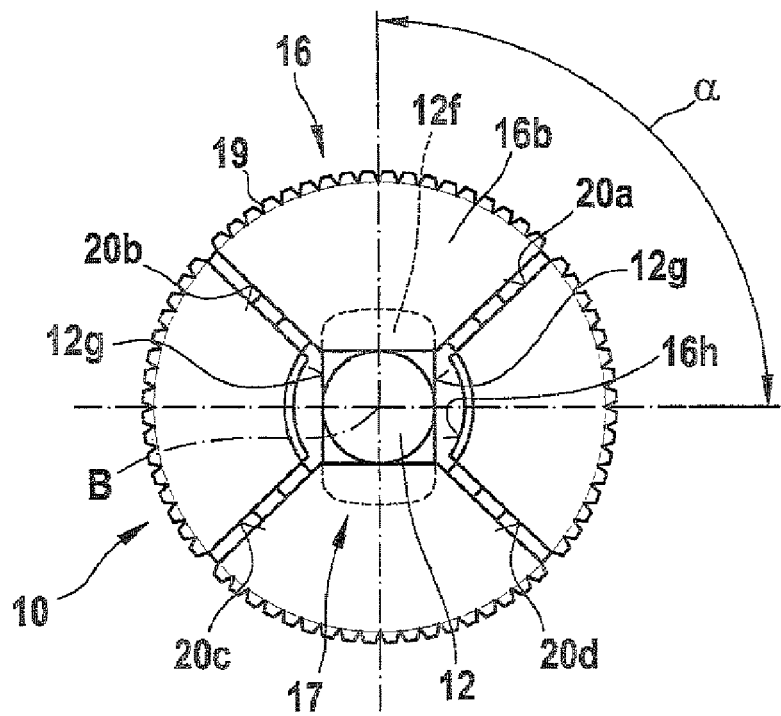
FIG. 2 shows a side view of the preassembled structural unit of FIG. 1.

In FIG. 2, the clamping means 16 is provided with continuous, intersecting longitudinal cuts 20a-d. These longitudinal slits 20a-d extend from the rim 16b in the direction of the longitudinal axis B as far as the first annular groove 16c oriented toward the elastomer part 14. They divide the clamping means 16 into four spring-elastic segments, and the diametrically opposed segments are symmetrical to one another in their dimensions. As a result, especially in the region of the rim 16b, the clamping means 16 has spring-elastic properties. In conjunction with the beveled back flank of the annular groove 16c, these properties enable radial widening of the clamping means 16, by subjection of the clamping means 16 to an axial force, and consequently make it possible for the existing locking to the armature 12 to be overcome. Under the influence of the axial force, the clamping means can then be manually displaced along the longitudinal axis B of the armature 12 into its clamping position. The clamping position is reached as soon as the protrusion 12e has snapped into the second annular groove 16d, remote from the elastomer part 14, of the clamping means 16.

The spring-elastic segments together define the aforementioned internal contour 16h. This contour has an essentially rectangular shape, with outward-curved short sides diametrically opposite one another. The clamping means 16 in FIG. 2 is in the non-oriented position relative to the armature portion 12f. As a result, through the internal contour 16h, the two flattened faces 12g located beneath it in the armature portion 12f can be seen in some portions. The further course of the external contour of the armature portion 12f concealed by the clamping means 16 and is therefore represented in FIG. 2 by dashed lines. By a rotary motion of the clamping means 16 about a rotary angle α of preferably 90°, the described actuation-securing means 17 can be manually released. Once the clamping means 16 has been oriented relative to the external contour of the armature portion 12f, the clamping means 16 can be displaced manually in the direction of the longitudinal axis B out of its basic position to its clamping position.

FIG. 2 finally also shows that the circumferential surface of the rim 16b may be provided with surface profiling 19, for instance, in order to facilitate the aforementioned manual actuation of the clamping means 16.

Figure 3:
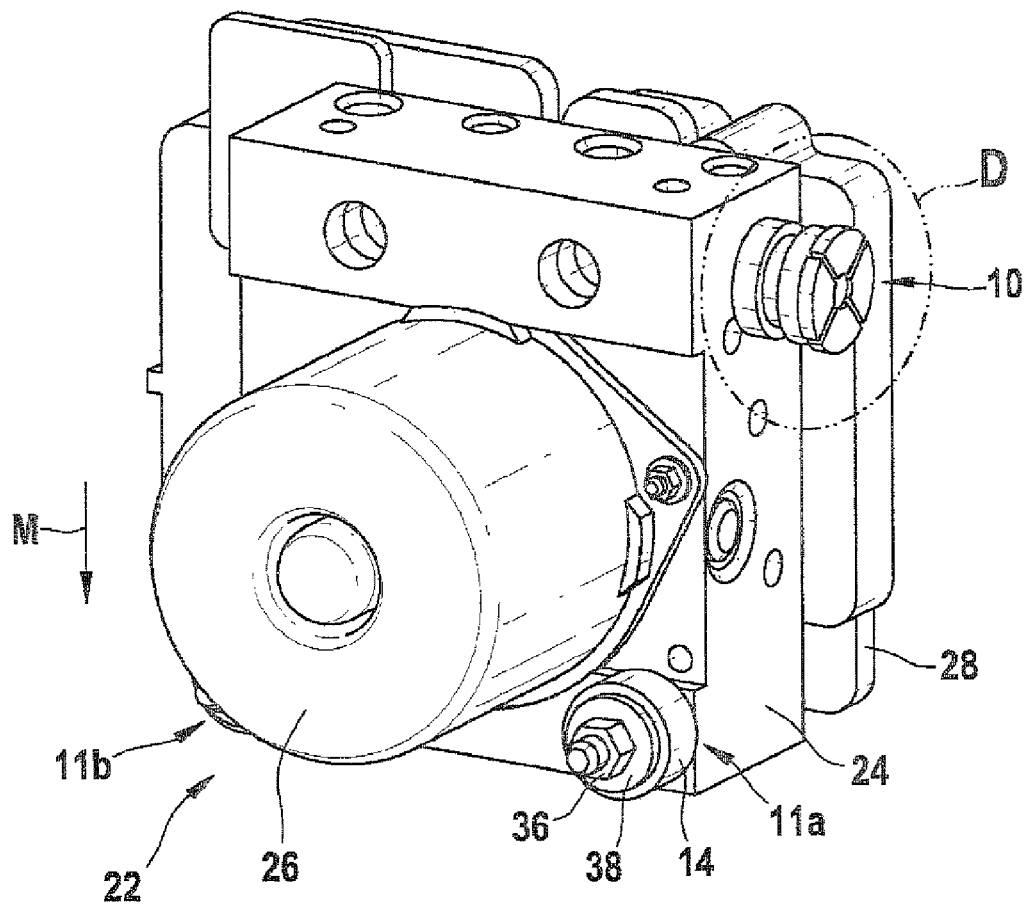
FIG. 3, in a three-dimensional view, shows a unit with an attached device according to the invention and a bracket in which the unit can be disposed with the aid of that device.
Figure 3:
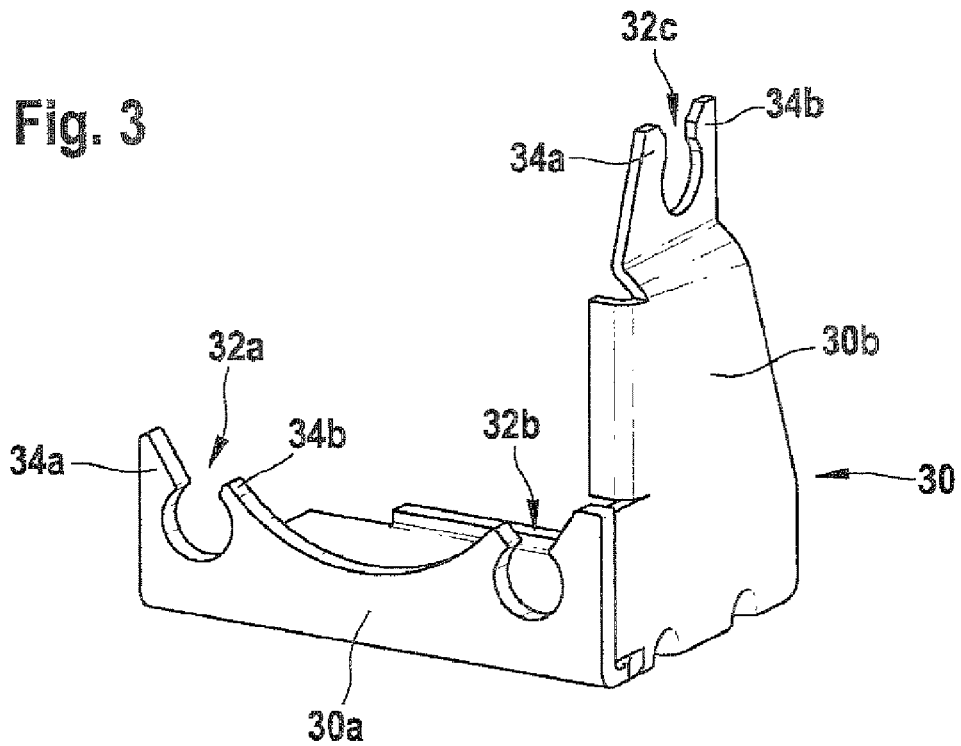

FIG. 3 shows a unit 22 onto which a device 10 of the invention is mounted. This unit 22 comprises a block-shaped unit housing 24, machined in metal-cutting fashion, with an electric motor 26 secured to it and with an electronic control unit 28 secured on the side diametrically opposite the electric motor 26. Units of this kind are well known in their construction from slip-controlled vehicle brake systems and therefore need not be described in detail. They serve to modulate the brake pressure in wheel brakes connected to them, taking into account the braking intention of the driver and the slip conditions at the wheels of the vehicle. The wheel brakes are connected to the unit 22 via brake lines (not shown in FIG. 3).

Such units 22 are typically anchored to the body of a vehicle with the aid of a bracket 30. The bracket 30 shown for this purpose has a first, horizontally oriented leg 30a and a second leg 30b extending perpendicular to the first. Both legs 30a, b are bent at right angles, and two receptacles 32a, b oriented in a first direction in space are embodied at the bend of the horizontal first leg 30a. The second leg 30b forms a third receptacle 32c, oriented in a second direction in space. The receptacles 32a, b, c are shell-shaped rounded areas, open toward an assembly direction (represented by the directional arrow M), with pairs 34a, b of claws disposed laterally of them and constricting the opening. Three devices 10, 11a, 11b are secured to the unit 22 and in the assembled state of the unit 22 rest in the respective associated receptacles 32a, b, c.

In the exemplary embodiment of FIG. 3, only the device 10 (detail D) is embodied according to the invention; in FIG. 3, it is anchored on the right-hand outer side of the metal block 24. Of the other two devices 11a, 11b, only the device 11a can be seen in detail. It has a screw nut 36, by way of which all elastomer part 14 can be mechanically prestressed via a sleeve element 38.

Figure 4:
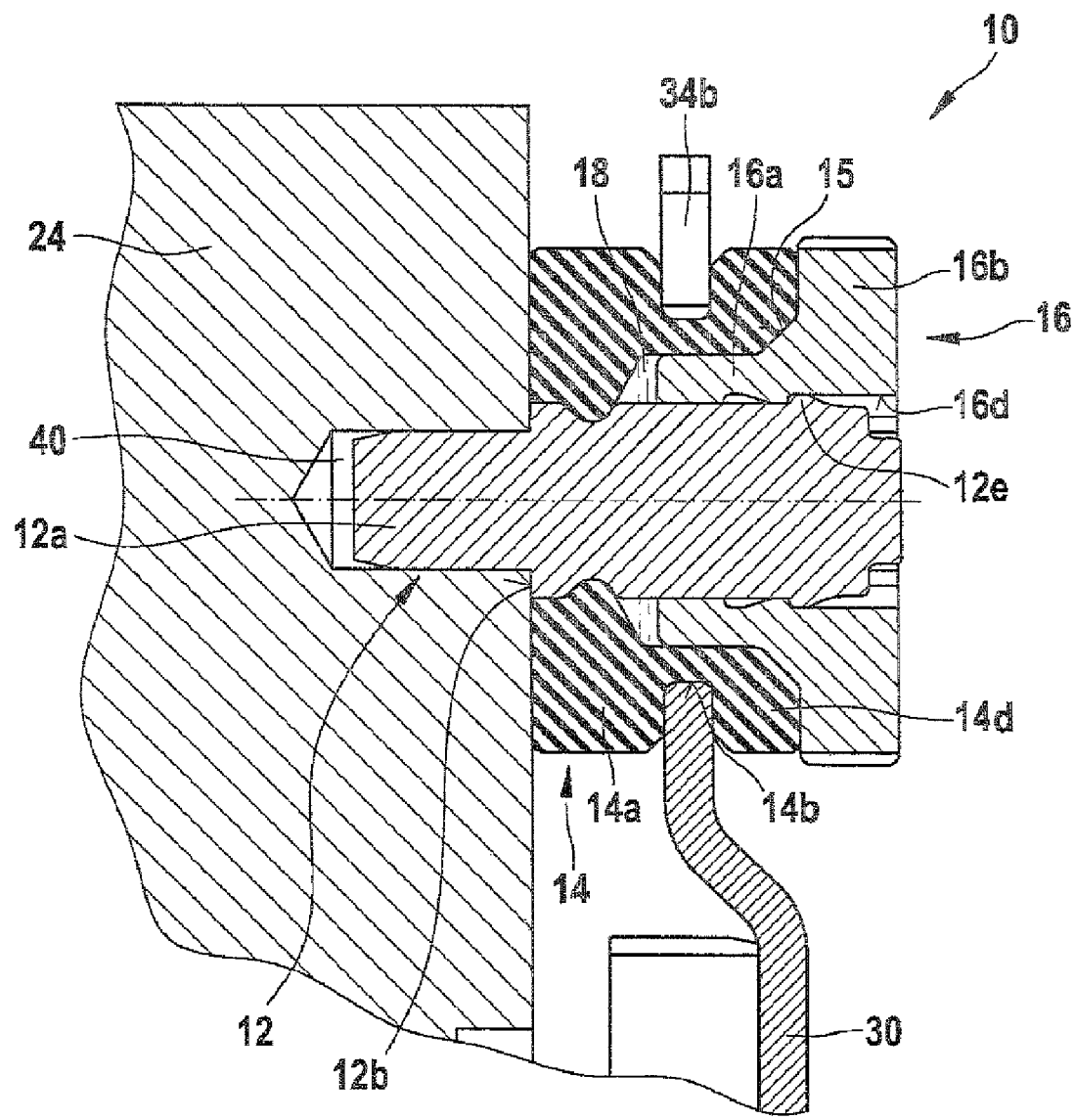
FIG. 4 shows a detail D of FIG. 3 in longitudinal section, here showing the device of the invention in its clamping position.

FIG. 4, finally, shows detail D of FIG. 3, enlarged and in longitudinal section. The device 10 is press-fitted with its armature 12, via the first cylindrical armature portion 12a, into a receiving bore 40 in the unit housing 24. In this press-fitted state, the shoulder 12b of the armature 12 is braced on the outside of this unit housing 24. At the same time, the first end portion 14a of the elastomer part 14 rests on the unit housing 24. The pair of claws of the bracket 30 embraces the middle portion 14b of the elastomer body 14 of the device 10; because of the course of the section in FIG. 4, only the rear claw 34b of this pair of claws can be seen.

In FIG. 4, the clamping means 16 is in its clamping position. In it, there is a detent connection between the annular groove 16d, facing away from the elastomer body 14, and the protrusion 12e of the armature 12. The rim 16b of the clamping means 16 presses axially, with its inside oriented toward the unit housing 24, against the end face, remote from the unit housing 24, of the elastomer part 14. The outer cone 15 at the transition point from the collar 16a to the rim 16b of the clamping means 16 acts on the outlet chamfer 14h at the opening 14f of the elastomer part 14 and as a result widens this elastomer part 14. In the clamping position shown, the middle portion 14b of the elastomer part 14 thus presses against the inner face of the claw 34b. Moreover, the two end portions 14c, d of the elastomer body 14 are pressed, with their faces oriented toward the middle portion 14b, laterally against the claw 34b.

The collar 16a of the clamping means 16, in this clamping position, extends axially to beyond the middle portion 14b of the elastomer part 14, so that the chamber 18 between the armature 12 and the elastomer part 14 occupies a minimal volume. As a consequence, the elastomer part 14 now has only a slight residual elasticity, which is sufficient for effective damping of any transmission of mechanical or hydraulic vibration that may occur from the unit 22 to the vehicle body via the bracket 30.

It is understood that changes or additions to the exemplary embodiment described may be made without departing from the fundamental concept of the invention.

The invention claimed is:

1. A device for vibration-damping suspension of a unit of an electronic slip-controlled brake system of a vehicle, in an associated receptacle, the device comprising:
    an armature for disposing the device on the unit, the armature protruding in some portion past the outer dimension of the unit;
    an elastomer part disposed as a sleeve on the protruding portion of the armature, the elastomer part having a middle portion of reduced outside diameter and first and second end portions, disposed to both sides of the middle portion, the first and second end portions having outside diameters that are increased compared to the middle portion; and
    a clamping means disposed in an axially displaceable manner on the armature which be switched from a basic position to a clamping position, wherein the clamping means in its clamping position urges the elastomer part with an axial force, and wherein the clamping means can be switched from its basic position to its clamping position by manual actuation, and in its basic position and in its clamping position the clamping means is locked to the armature, wherein the device has an integrated, manually releasable actuation-securing means, which fixes the clamping means, in its basic position, nondisplaceably on the armature.

2. The device according to claim 1, wherein the actuation-securing means is releasable by means of a rotary motion of the clamping means relative to the armature.

3. A unit of a slip-controlled brake system of a vehicle, at least two devices mounted on the unit such that the at least two devices are oriented in two directions in space, a bracket secured to the vehicle and retaining the unit, the bracket having receptacles associated with the devices and receiving the devices, wherein at least one of these devices is embodied according to claim 2.

4. The device according to claim 1, wherein the clamping means is a bush, provided with axial slits, the bush having a collar that is lockable to the armature and a radially protruding rim formed integrally on the collar, wherein the rim at least partially covers an end face, of the elastomer part facing toward the rim.

5. The device according to claim 4, wherein the collar of the clamping means plunges into an opening in a void between the armature and the elastomer part, in such a way that in the basic position of the clamping means, the collar extends to just before the middle portion of the elastomer part; and that in a clamping position of the clamping means, the collar extends past the middle portion of the elastomer part into the void.

6. A unit of a slip-controlled brake system of a vehicle, at least two devices mounted on the unit such that the at least two devices are oriented in two directions in space, a bracket secured to the vehicle and retaining the unit, the bracket having receptacles associated with the devices and receiving the devices, wherein at least one of these devices is embodied according to claim 4.

7. The device as according to claim 1, wherein the elastomer part is retained on the armature by positive engagement.

8. The device according to claim 1, wherein the clamping means, in its interior, has axially spaced-apart recesses or protrusions, associated with the basic position and the clamping position, wherein the recesses or protrusions engage a protrusion of complementary shape or a receptacle of complementary shape in the armature.

9. The device according to claim 1, wherein the armature is press-fitted or screwed with a first armature portion into a receiving bore of the unit, or that the armature is caulked to the unit.

10. A unit of a slip-controlled brake system of a vehicle, at least two devices mounted on the unit such that the at least two devices are oriented in two directions in space, a bracket secured to the vehicle and retaining the unit, the bracket having receptacles associated with the devices and receiving the devices, wherein at least one of these devices is embodied according to claim 1.

11. A device for vibration-damping suspension of a hydraulic unit of an electronic slip-controlled brake system of a vehicle, in an associated receptacle, the device comprising:
- an armature embodied as a bolt, for disposing the device on the unit, the armature protruding in some portion past the outer dimension of the unit;
- an elastomer part disposed as a sleeve on the protruding portion of the armature, the elastomer part having a middle portion of reduced outside diameter and first and second end portions, disposed to both sides of the middle portion, the first and second end portions having outside diameters that are increased compared to the middle portion; and
- a clamping means disposed in an axially displaceable manner on the armature which be switched from a basic position to a clamping position, wherein the clamping means in its clamping position urges the elastomer part with an axial force, and wherein the clamping means can be switched from its basic position to its clamping position by manual actuation, and in its basic position and in its clamping position the clamping means is locked to the armature,
- wherein the clamping means, prior to an introduction of the device in the associated receptacle, is arranged on the armature into the middle portion of the elastomer part, and the clamping means is locked with the armature in its basic position and its clamping position.

12. A unit of a slip-controlled brake system of a vehicle, at least two devices mounted on the unit such that the at least two devices are oriented in two directions in space, a bracket secured to the vehicle and retaining the unit, the bracket having receptacles associated with the devices and receiving the devices, wherein at least one of these devices is embodied according to claim 11.

13. The device according to claim 11, wherein the clamping means and the armature have cooperating portions which form a releasable actuation-securing means, which fixes the clamping means, in its basic position, nondisplaceably on the armature.

14. The device according to claim 13, wherein the actuation-securing means is releasable by means of a rotary motion of the clamping means relative to the armature.

15. The device according to claim 14, wherein the clamping means is a bush, provided with axial slits, the bush having a collar that is lockable to the armature and a radially protruding rim formed integrally on the collar, wherein the rim at least partially covers an end face of the elastomer part facing toward the rim.

16. The device according to claim 15, wherein the collar of the clamping means plunges into an opening in a void between the armature and the elastomer part, in such a way that in the basic position of the clamping means, the collar extends to just before the middle portion of the elastomer part; and that in a clamping position of the clamping means, the collar extends past the middle portion of the elastomer part into the void.

17. A unit of a slip-controlled brake system of a vehicle, at least two devices mounted on the unit such that the at least two devices are oriented in two directions in space, a bracket secured to the vehicle and retaining the unit, the bracket having receptacles associated with the devices and receiving the devices, wherein at least one of these devices is embodied according to claim 14.

18. The device as according to claim 11, wherein the elastomer part is retained on the armature by positive engagement.

19. The device according to claim 11, wherein the clamping means, in its interior, has axially spaced-apart recesses or protrusions, associated with the basic position and the clamping position, wherein the recesses or protrusions engage a protrusion of complementary shape or a receptacle of complementary shape in the armature.

20. The device according to claim 11, wherein the armature is press-fitted or screwed with a first armature portion into a receiving bore of the unit, or that the armature is caulked to the unit.

* * * * *